United States Patent [19]

Imazeki et al.

[11] Patent Number: 4,668,952
[45] Date of Patent: May 26, 1987

[54] RADAR DETECTOR

[75] Inventors: Kazuyoshi Imazeki; Seizi Koyama, both of Tokyo, Japan

[73] Assignee: General Research of Electronics, Inc., Tokyo, Japan

[21] Appl. No.: 648,537

[22] Filed: Sep. 6, 1984

[51] Int. Cl.$^4$ ............................................. G01S 7/42
[52] U.S. Cl. ................................................. 342/20
[58] Field of Search .................. 343/18 E, 384 E; 340/600; 250/388, 372

[56] References Cited

U.S. PATENT DOCUMENTS

| | | | |
|---|---|---|---|
| 4,313,216 | 1/1982 | Jaeger et al. | 455/226 |
| 4,315,261 | 2/1982 | Mosher | 343/18 E |

Primary Examiner—Thomas H. Tarcza
Assistant Examiner—Donald E. Hayes, Jr.
Attorney, Agent, or Firm—Trexler, Bushnell, Giangiorgi & Blackstone, Ltd.

[57] ABSTRACT

A radar detecting system comprises an antenna for receiving radar signals, a sweep generator for producing a sweep signal over a predetermined range of frequencies and at a predetermined rate and a mixer for mixing the sweep signal with the received radar signal for producing intermediate frequency (IF) signals. A bandpass filter passes only those IF signals within a predetermined frequency band and a detector responds to the IF signals passed by the bandpass filter by producing corresponding output pulses. A control circuit is responsive to a pair of output pulses being produced for each of three successive cycles of the sweep signal and to both the first pulse and the second pulse of each pair of pulses occurring at the same time intervals respectively relative to the corresponding cycle of the sweep signal for producing a warning signal. An alarm circuit comprises a signal strength detector for producing a DC signal having an amplitude which varies in a predetermined fashion in accordance with the level of the received signal and a voltage-to-frequency converter reponsive to the DC signal for producing an alarm signal alternating between a first level and a second level at a frequency which varies in a predetermined fashion in accordance with the amplitude of the DC signal.

15 Claims, 4 Drawing Figures

RADAR DETECTOR

BACKGROUND OF THE INVENTION

This invention relates generally to a radar detecting receiver, and more particularly to such a receiver which is surprisingly accurate in detecting selected carrier wave (CW) signals of the type generally used in radar systems while rejecting other noise or spurious signals. The invention also is particularly directed to a novel alarm system for such a receiver which indicates the relative strength of a received signal and hence the relative distance of the signal source from the receiver.

The receiver of the invention is useful in detecting the presence of radar signals emitted in both the X-and K-bands. The Federal Communications Commission of the United States has established that X-band radar signals be transmitted at 10.525 GHz with a tolerance of plus or minus 0.025 GHz and that K-band radar signals be transmitted at 24.150 GHz with a tolerance of plus or minus 0.100 GHz. The prior art has proposed a number of receivers from relatively simple crystal detectors to more sophisticated superhetrodyne type receivers for the detection of radio frequency signals in this range. Heretofore, however, the relatively broad bandwidth required to insure reception of signals within the above frequency ranges has been found to adversely affect the sensitivity of the receiver.

Moreover, considerable problems with spurious signals have been encountered. Because of the relatively broad frequency band mentioned above and the need for sufficient sensitivity to detect a radar signal at some distance, such receivers have heretofore been susceptible to interference from noise signals. Such noise signals may originate in other radio or radar bands. Additionally, a considerable number of noise or spurious signals in other radar bands have been found to be generated by some relatively "noisy" radar detector units presently in use.

The user of such a radar detector may also desire information as to the relative distance of the radar source. In this regard, it is of particular interest to know whether one is approaching the radar source or receding from the radar source. Radar detectors heretofore have generally not provided a suitable indication of such information.

OBJECTS AND SUMMARY OF THE INVENTION

Accordingly, it is a general object of the invention to provide a novel and improved radar or CW wave detector.

A more specific object is to provide such a radar or CW wave detector which is surprisingly accurate in detecting a given radar or CW signal and yet surprisingly insensitive to spurious or noise signals.

A related object is to provide a radar or other radio signal detector which provides an indication of the relative distance of the source of the radar or other radio signal from the receiver, preferably in the form of an indication of whether the signal source is approaching or receding from the receiver.

Briefly, and in accordance with the foregoing objects, a radar detecting system comprises antenna means for receiving radar signals, sweep generator means for producing a sweep signal comprising a cyclical frequency-swept signal over a predetermined range of frequencies and at a predetermined rate and mixer means coupled with the antenna means and the sweep generator means for mixing the sweep signal with the received radar signal for producing intermediate frequency (IF) signals. Bandpass filter means are coupled with the mixer means for passing only those IF signals within a predetermined frequency band and detector means are provided for detecting the IF signals passed by the bandpass filter means and responsive thereto for producing corresponding output pulses. Control circuit means are coupled with the detector circuit means and responsive to a pair of output pulses being produced for each of three successive cycles of said sweep signal and to both the first pulse and the second pulse of each of said pairs occurring at the same time intervals respectively relative to the corresponding cycle of said sweep signal for producing a warning signal.

In accordance with another aspect of the invention, a novel alarm circuit for a signal detector comprises signal strength detector means responsive to a received signal for producing a DC signal having an amplitude which varies in a predetermined fashion in accordance with the level of the received signal and voltage-to-frequency converter means responsive to the DC signal for producing an alarm signal alternating between a first level and a second level at a frequency which varies in a predetermined fashion in accordance with the amplitude of the DC signal.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

DETAILED DESCRIPTION OF THE ILLUSTRATED EMBODIMENT

Figure 1:
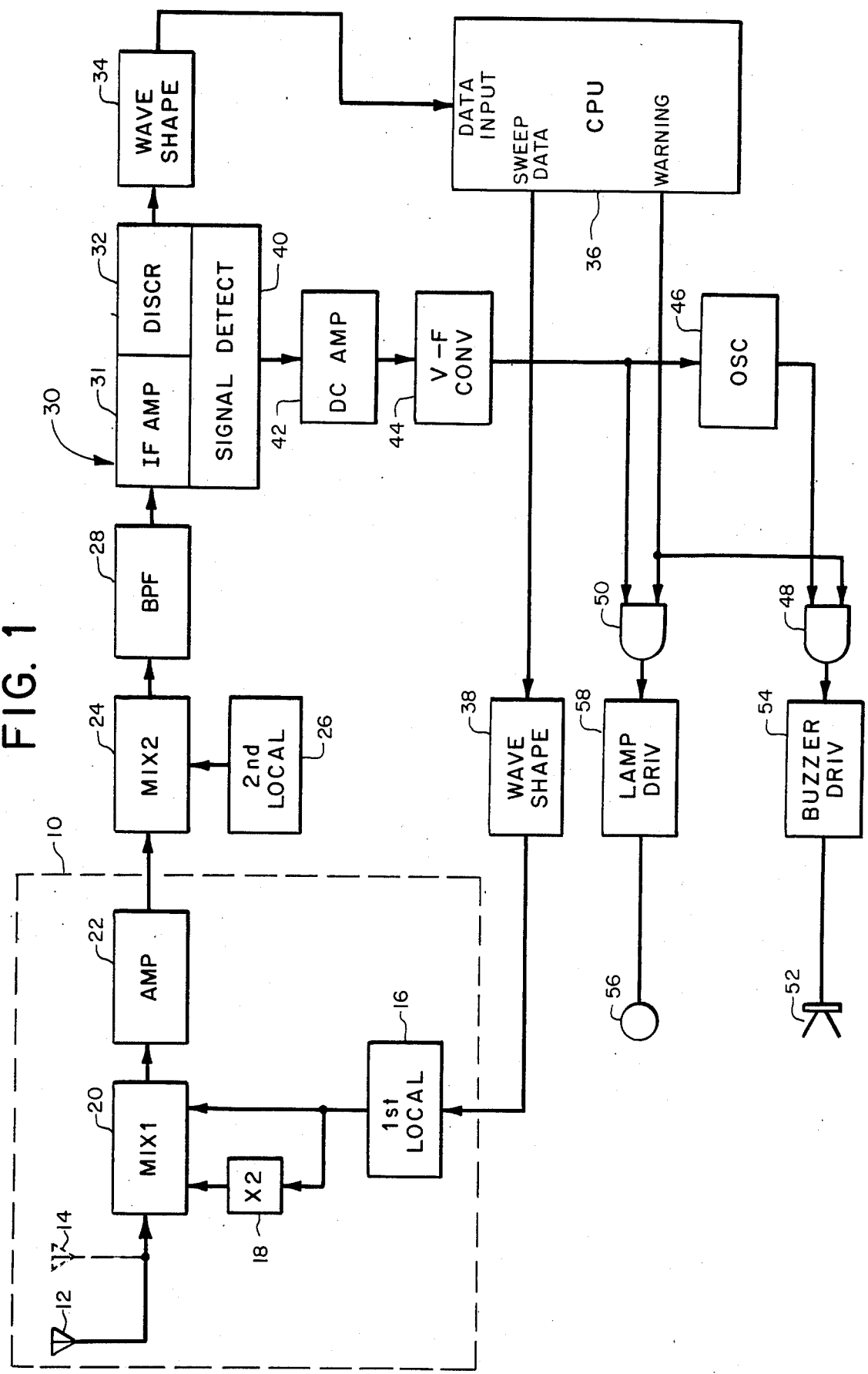
FIG. 1 is a block diagram of a radar detector system in accordance with a preferred form of the invention.
Figure 2:
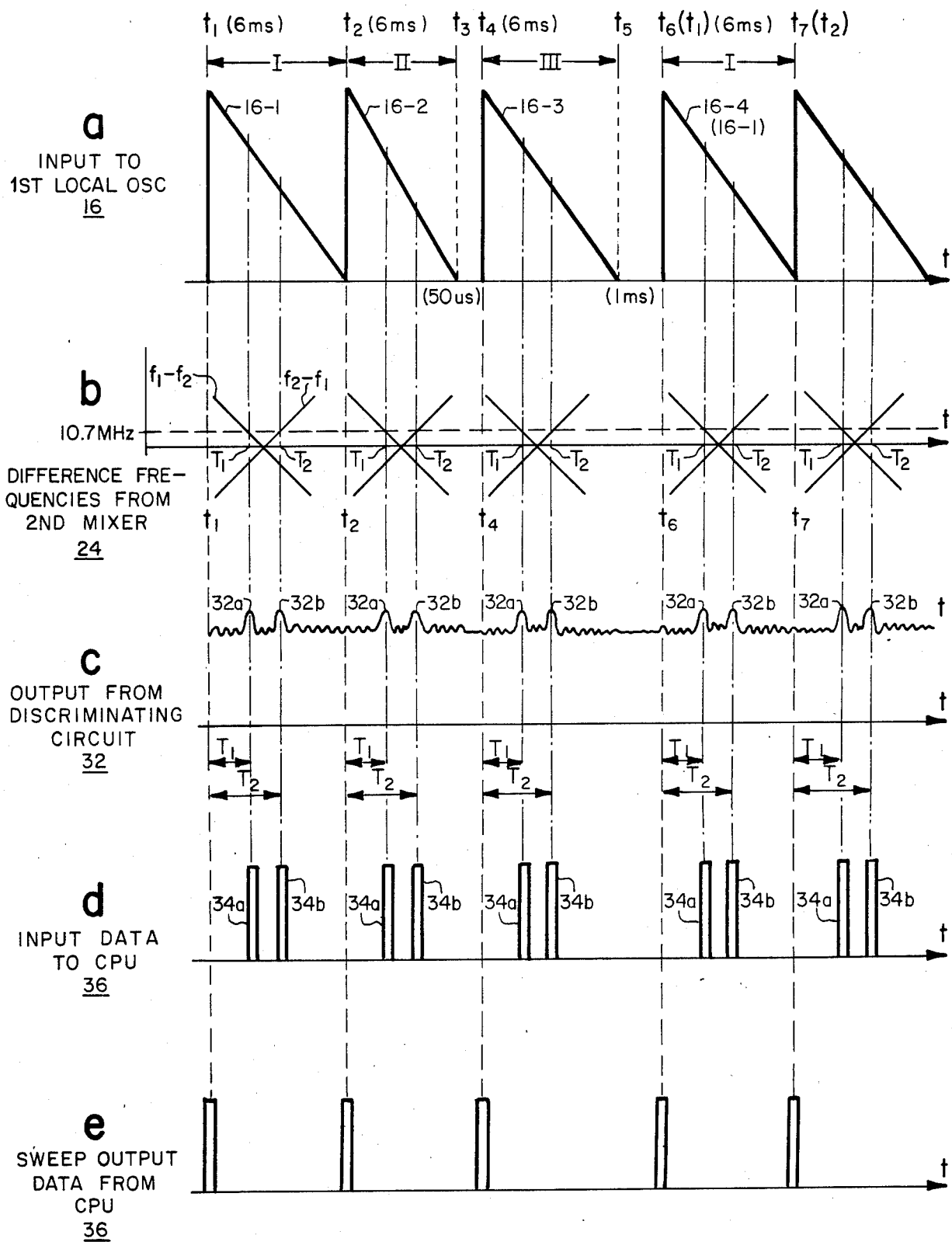
FIG. 2 is a series of graphic representations of waveforms produced at several indicated portions of the system of FIG. 1.

Referring now to the drawings and initially to FIG. 1, a radar detecting system includes a radio frequency (RF) front end portion 10. This RF front end portion 10 in the illustrated embodiment includes antenna means in the form of one or more antennas 12, 14 for receiving radar signals. The antennas 12, 14 feed the received radar signals to mixer means including a first mixer circuit (MIX 1) 20. A sweep generator in the form of a first local oscillator 16 produces a sweep signal comprising a cyclically repeating frequency-swept signal over a predetermined range of frequencies and at a predetermined rate. This sweep signal is generated in response to controlling sweep data produced by a control circuit or CPU 36. The sweep generator also includes a wave shaping circuit 38 coupled intermediate CPU 36 and mixer 20. In operation, the wave shaping circuit 38 generates a cyclically repeating signal of the form shown in the graph of FIG. 2a, in response to the sweep data from the CPU 36, which is shown in the graph of FIG. 2e. The CPU includes sweep control means which produces the sweep data and is coupled to the wave shape circuit 38. The sweep data comprises a series of sweep initiation pulse signals at predetermined intervals shown in the graph of FIG. 2f and the sweep generator is responsive to each sweep initiation pulse signal for initiating one cycle of the sweep signal.

The first local oscillator 16 responsively produces a cyclical sweep signal over a range of frequencies at the rate of the signal of FIG. 2a for mixing at mixer 20 to receive X-band radar signals, which are transmitted at 10.525 GHz with a tolerance of plus or minus 0.025 GHz. In the illustrated embodiment this range of frequencies is from 11.458 GHz to 11.658 GHz. In order to produce a frequency swept signal for receiving K-band radar signals, which are transmitted at 24.150 GHz plus or minus 0.100 GHz, a frequency doubler (X 2) 18 is provided intermediate the first local oscillator 16 and mixer 20.

The mixer means further includes a second mixer (MIX 2) 24 and a second local oscillator (2nd LOCAL) 26 for producing intermediate frequency (IF) output signals. A first IF amplifier (AMP) 22 is coupled intermediate the first mixer 20 and second mixer 24.

In operation, then, the mixer means comprises both first and second mixers 20 and 24. The first mixer 20 is for mixing the sweep signal with the radar signal to produce a first IF signal. The second mixer 24 then mixes the second local oscillator signal with the first IF signal to produce a second IF signal comprising an IF output signal of the mixer means. Bandpass filter means in the form of a bandpass filter circuit (BPF) 28 is coupled with the mixer means at the output of second mixer 24. This bandpass filter is adjusted to pass only those of the IF output signals which have frequencies within a predetermined frequency band. In the illustrated embodiment, the frequency of the second local oscillator is chosen at 1.033 GHz and the passband of the BPF 28 is chosen around a center frequency of 10.7 MHz. Accordingly, respective difference frequency outputs from the second mixer 24 will include difference frequencies as graphically illustrated in the graph of FIG. 2b and designated generally as f1−f2 and f2−f1. It will be noted that each of these difference frequencies reaches the 10.7 MHz center value of the BPF 28 at a given time interval, here designated as T1 and T2, relative to the starting time T1 of the corresponding cycle of the sweep signal which is produced in cycles corresponding to the cycles of the signal shown in FIG. 2a.

As mentioned above, the first local oscillator sweeps through the frequencies from 11.458 GHz to 11.658 GHz. Accordingly, taking the frequency of the first local oscillator 16 as f1 in the case of X-band radar signals and the frequency of the X-band signal as f2, it will be seen that the difference frequency signals will cross the 10.7 MHz center frequency of the BPF 28 twice for each cycle of the sweep generator. In the same fashion, the frequency produced by the frequency doubler 18 will run between 23.316 GHz and 22.916 GHz, and when mixed with the K-band signals of the range mentioned above will also produce difference frequency signals which cross the 10.7 MHz center frequency as shown in the graph of FIG. 2b. The signals passed by the BPF 28 are fed to an IF amplifier (IF AMP) 31 and a detector or discriminating circuit (DISCR) 32 which form a part of a second IF circuit 30. The discriminator 32 will produce a waveform of the type illustrated in the graph of FIG. 2c. In the illustrated embodiment, the detector discriminator 32 comprises an FM detector or discriminator. While the detection characteristic of such an FM detector can generally be expressed as an S-shaped curve, in the embodiment illustrated, the output waveform (FIG. 2c) utilizes only the upper half or positive portion of the S-shape characteristic. Accordingly, the waveform (FIG. 2c) will be seen to have two spaced apart high level or peak portions 32a and 32b centered about the same times T1 and T2 as the 10.7 MHz crossings of the difference frequencies of FIG. 2b.

This detector output signal is fed through a wave shaping circuit 34 to the input of the control circuit or CPU 36. The wave shaping circuit 34 produces input data to the CPU 36 of the form shown in the graph of FIG. 2d. This data comprises pairs of well defined pulses 34a and 34b, centered about the same times T1 and T2 as the output pulses 32a and 32b of the discriminator 32. In this regard, it will be noted that when the X-band or K-band radar signals are present, respective corresponding pairs of pulses 32a, 32b and 34a, 34b will be produced at precisely the same time intervals T1 and T2 relative to the beginning of each cycle of the sweep generator as shown by FIG. 2a. The beginnings of three successive ones of these cycles are here designated t1, t2 and t4 respectively. The start of the first two of a following series of three cycles are designated as t6 and t7. In this regard, the sweep data from the CPU 36 (FIG. 2e) will be noted to comprise a series of relatively sharp output pulses centered about the respective starting times t1, t2, etc. of the signal of FIG. 2a.

In operation, the discriminator 32 comprises detector means for detecting the IF output signals passed by the bandpass filter means during each cycle of the sweep signal and responsive to these signals for producing corresponding output pulses such as pulses 32a, 32b. The CPU 36 comprises control circuit means coupled with the detector and responsive to such a pair of ouput pulses 32a, 32b (as modified by the wave shape circuit into sharper pulses 34a, 34b in the illustrated embodiment being produced in each of three successive cycles of the sweep signal. (e.g. cycles t1–t2, t2–t3 and t4–t5). Moreover, the CPU 36 is responsive to both the first pulse (34a) and the second pulse (34b) of each of these pairs of pulses occuring at the same time intervals (T1 and T2) respectively relative to the corresponding cycle of the sweep signal for producing a warning signal at a "warning" output thereof.

Advantageously, this mode of operation requires that the desired X-band or K-band radar signal be present through at least three cycles of the sweep signal before the control circuit or CPU responds to the characteristic pairs of pulses produced by the discriminator 32. Hence, the system of the invention can be made quite sensitive while still covering the full frequency ranges of both the X-band and the K-band signals, and yet be relatively insensitive to spurious or noise signals. That is, the system of invention will not respond to any signals which do not comprise the desired or preselected continuous wave (CW) signals, which in the illustrated embodiment comprise the X-band and K-band radar signals.

It should be recognized that the CPU will be adjusted to respond to a given pair of time intervals T1, T2 for the X-band signals and a second pair of time intervals T1, T2 for the K-band signals. Moreover, it will be seen that the invention is not limited to the reception of X-band and K-band signals in this regard, since the CPU may be readily adjusted to respond to any desired time intervals T1 and T2 corresponding to any desired CW wave. Moreover, the frequencies swept by the first local oscillator, the frequency of the second local oscillator and the passband of the BPF 28 may all be varied to receive and detect CW signals in other frequency ranges, in the same fashion described above, without departing from the invention. Preferably, the warning signal from the CPU is utilized to trigger a suitable warning device in the form of an audible or visual alarm or other observable indicator, to indicate the presence of the desired CW signals.

Figure 3:
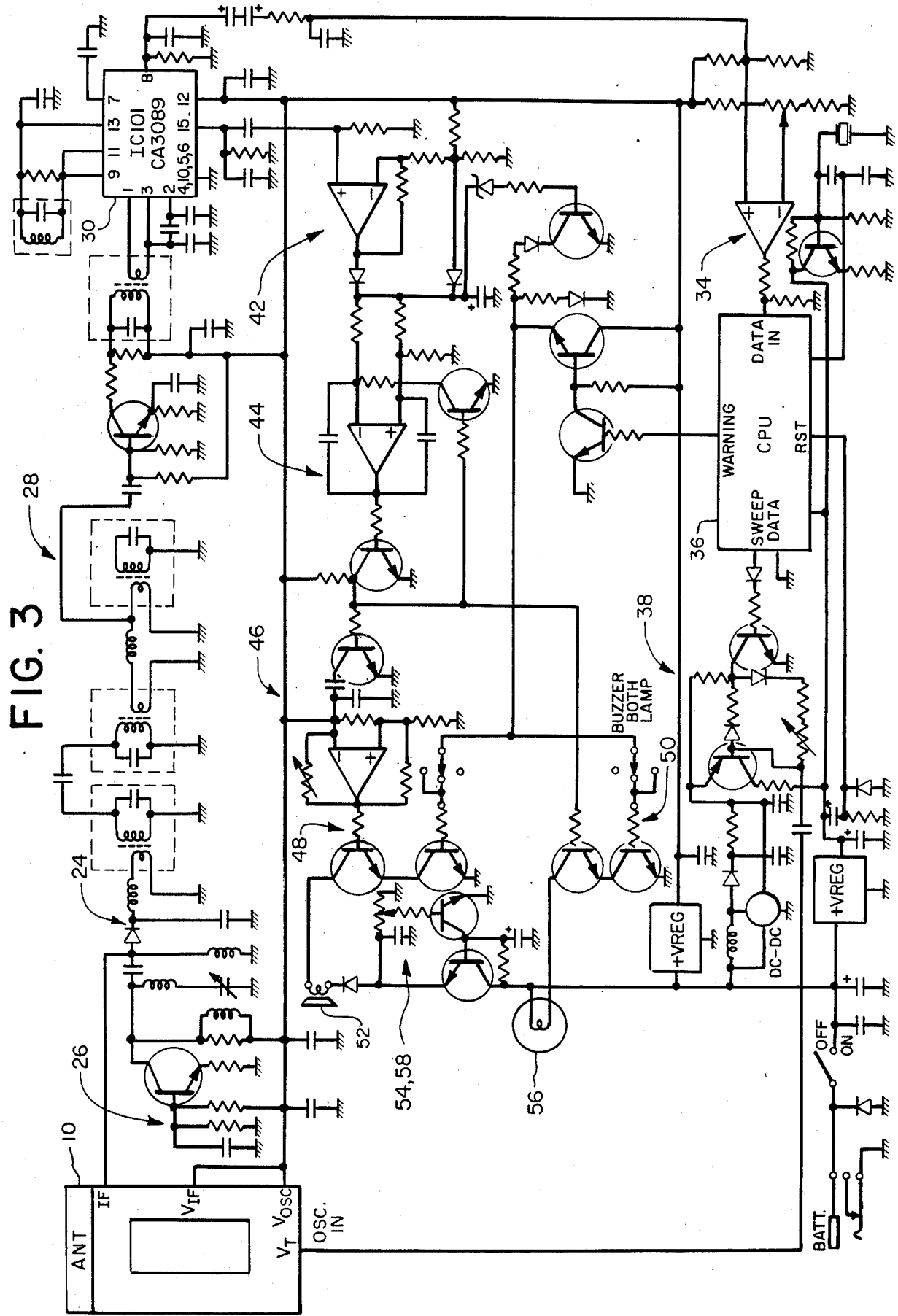
FIG. 3 is a schematic circuit diagram illustrating further details of a preferred form of the system of FIG. 1.

Details of the circuits illustrated in block form in FIG. 1 and thus far described are shown in FIG. 3, to which reference is also invited.

In operation, then, the CPU 36 measures the time interval between each sweep initiation pulse and each pulse of each of the pairs of pulses (if any) produced during the corresponding cycle of the sweep signal. The CPU then stores each of these measurements and compares at least three successive ones of these measurements for each pulse of the pair to determine whether the measurements are the same.

In accordance with a further aspect of the invention, a novel alarm means or observable indicator means is provided for indicating the relative strength of a received signal. While this novel alarm means is illustrated and described herein in conjunction with the radar detector circuit just described, it will be understood that the alarm means is not limited thereto. Rather, the novel alarm means may be utilized with any of a broad variety of receiver systems which include signal strength detector portions, such as a signal strength detector (SIGNAL DETECT) 40 illustrated in FIG. 1. This signal strength detector 40 comprises a part of the second IF circuit 30.

In the illustrated embodiment, and referring briefly to FIG. 3, this IF circuit may take the form of a commercially available integrated circuit component of the type designated CA3089. Other circuit components may be utilized for performing the same functions without departing from the invention. It will be recognized, in this regard, that similar IF circuits including signal strength detectors may be utilized in any of a broad variety of receiver systems, whereby the alarm means to be presently described may be utilized in such systems as well.

Referring now to the remaining portion of FIG. 1, the alarm system in accordance with the invention includes signal strength detector means, here taking the form of signal detector 40. This signal detector is responsive to a received signal for producing a DC signal having an amplitude which varies in a predetermined fashion in accordance with the level of the received signal. In this regard, signal detector 40 is responsive to the level of the IF signal from the BPF 28 for producing a DC voltage proportional to this signal level. A DC amplifier (DC AMP) 42 amplifies this DC signal from the signal detector and delivers the amplified signal to voltage-to-frequency converter means. This latter means here takes the form of a converter (V-F CONV) 44, which responds to the amplified DC signal for producing a first alarm signal alternating between a first and a second voltage level at a frequency which varies in a predetermined fashion in accordance with the amplitude of the DC signal.

Figure 4:
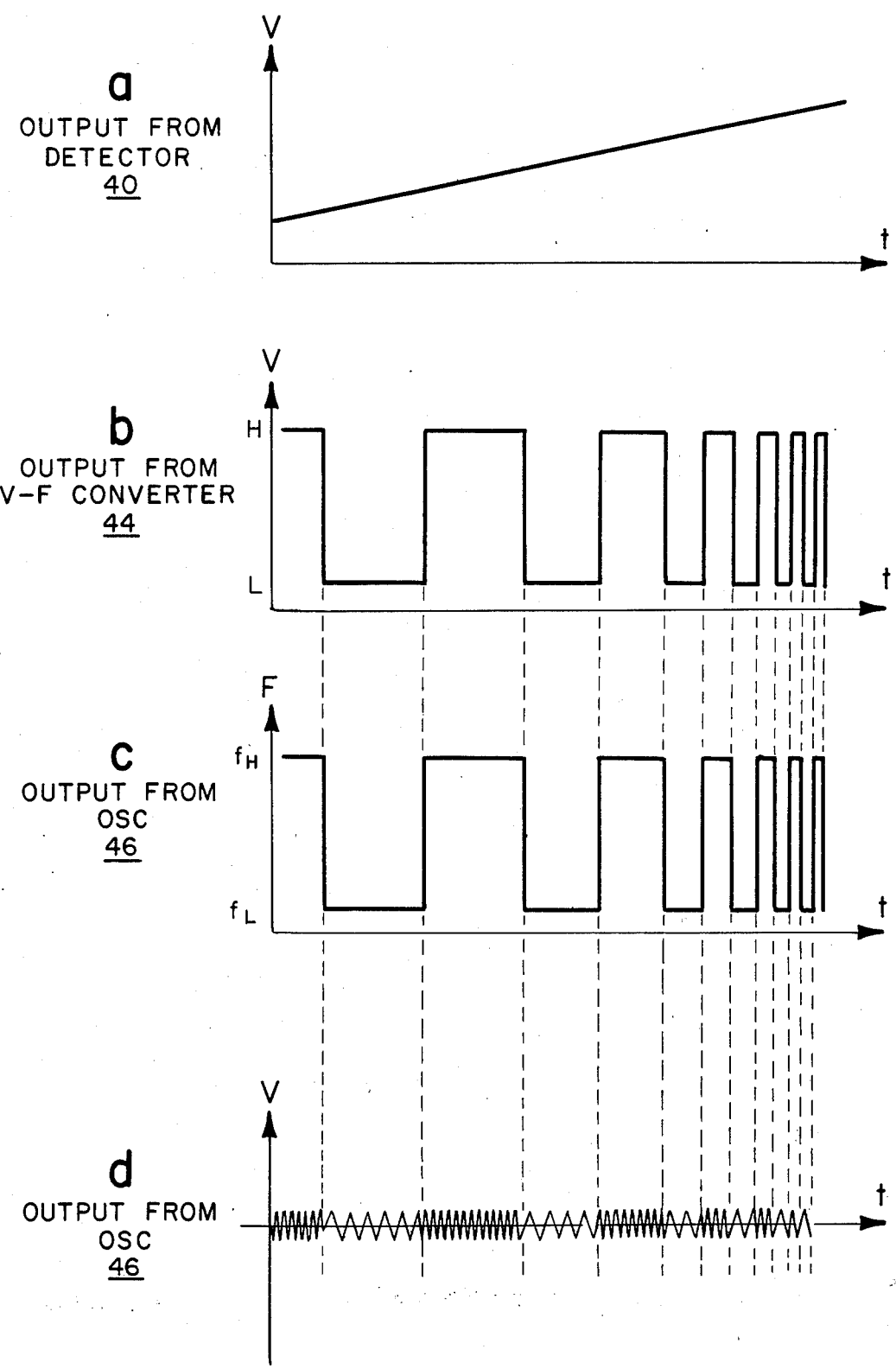
FIG. 4 is a series of graphic representations of waveforms produced, in accordance with a further aspect of the invention, by an alarm circuit portion of the system of FIG. 1 and circuit of FIG. 3.

In this regard, reference is also invited to FIG. 4 wherein a series of graphs illustrate exemplary waveforms produced by the components of the alarm system being described. In this regard, the output from the signal detector 40 is shown in the graph of FIG. 4a, while the output from the voltage-to-frequency (V-F) converter 44 is shown in the graph of FIG. 4b. It will be noted that, as the level of the signal represented by FIG. 4a increases, the frequency of the waveform in FIG. 4b also increases. In the illustrated embodiment, the frequency of the signal produced by the V-F converter 44 varies in direct proportion with the level of the output from the detector 40, which it will be remembered is fed thereto by way of DC amplifier 42.

The output of the V-F converter or first alarm signal may be utilized to drive a first observable indicator means or alarm, which in the illustrated embodiment takes the form of a lamp 56. In this regard, a two-input gate circuit 50 has one input thereof coupled to receive the first alarm signal from the V-F converter. A second input of gate circuit 50 is coupled to receive a control signal, here comprising warning signal produced by the CPU 36, as previously described in response to reception of one of the preselected or desired signal, here comprising X-band or K-band radar signals. It will be appreciated that a suitable control or warning signal may be generated by other means or in response to detection of other radio or radar signals without departing from the invention.

The gate circuit, 50, in turn, drives a lamp driver circuit (LAMP DRIV) 58, which in turn drives or energizes the lamp 56. Hence, it will be appreciated that the lamp will flash on and off or be energized between first and second observable states at the rate of the frequency of the first alarm signal (see FIG. 2b) Moreover, it will be recognized from the above discussion that the frequency or rate of flashing of the lamp 56 will be indicative of the strength of the received signal. Hence, the gating means or gating circuit 50 is responsive to the warning signal for gating the first alarm signal to the indicator or lamp 56 and is operative for blocking the first alarm signal in response to the absence of the warning signal from the CPU 36.

Such an indicator of not only the presence of a given preselected signal (such as the X-band or K-band radar, as discussed above), but also of its relative strength is useful in many applications. For example, an observer operator may wish to know the relative distance between the receiver or detector apparatus (including the alarm circuits just described) and the source of the radio or radar signal being received or detected thereby. In the example illustrated, the signal strength indicated in FIG. 4a is generally increasing, indicating increasing signal strength. This, in turn, indicates that the distance between the source of the signal and the receiver is generally decreasing. Hence, the frequency of the signal of FIG. 2b, which will also be appreciated to be the frequency or rate of oscillation or flashing of lamp 56, is correspondingly increasing. It will be appreciated that, with an increasing frequency or rate of flashing of lamp 56, the observer will recognize that the source of the received signal is approaching. Conversely, a decreasing frequency of flashing of the lamp will indicate that the source of the signal is receding with respect to the receiver.

In accordance with the illustrated embodiment, a further observable indicator or alarm device is provided in the form of an audible indicator or buzzer 52. This buzzer is driven by a buzzer drive circuit 54 which, in turn, is energized or de-energized from a gate circuit 48. This gate circuit 48 has two inputs, one of which is fed from the warning output of the CPU 36. As discussed above with respect to gate 50, other warning or control signals from other sources may also be provided at this first input to gate 48 without departing from the invention.

The second or remaining control input of the gate circuit 48 is driven from an oscillator circuit (OSC) 46. In the illustrated embodiment, this oscillator 46 comprises a controllably variable oscillator for producing a second alarm signal at a frequency which varies in accordance with the level of a signal received thereby. The oscillator 46 is coupled to receive the first alarm signal from the V-F converter 44 so as to vary between first and second frequencies corresponding to the first and second levels of the first alarm signal and at the rate of the frequency of the first alarm signal. Reference is also invited briefly to FIG. 3 wherein additional details of the circuits thus far described are illustrated.

Accordingly, it will be recognized that the tone or sound from the buzzer 52 will be at the frequency of the output signal of the oscillator 46 when this signal is gated through gate circuit 48. This audible alarm or buzzer tone will therefore vary between the first and second frequencies at a rate indicative of the strength of the received signal. In this regard, reference is invited to the graphs of FIGS. 4e and 4d which illustrate respectively the output of the oscillator circuit 46 varying between first and second (or high and low) frequencies fH and fL, and a somewhat diagrammatic representation of the output of the oscillator 46 and hence of the frequency of the tone produced by the buzzer or audible alarm means 52. In the illustrated embodiment, the oscillator 46 is adjusted such that fh is 1.2 KHz and fL is 1.0 KHz.

Again viewing all of the graphs of FIG. 4, it will be recalled that the output from the V-F converter 44 varies proportionately with the output from the detector 40 which, it will be recalled, is proportional to the signal strength of the received signal. Responsively, the output from the oscillator varies between first or high frequency fH in response to the higher level output H of the V-F converter 44 and second or low frequency fL in response to the low level L of the V-F converter 44.

In operation, in addition to observing the rate of flashing of the lamp 56, the operator will also observe the rate of oscillation or change in the tone or freqency of the buzzer 52. An increase in the rate of variation between the two frequencies or tones from the buzzer 52 will indicate an increasing signal strength, while a decrease in this rate of variation between the two tones will indicate a decrease in received signal strength. In the same fashion described above, an increase in the rate of variation of the tone and of the rate of flashing of the lamp 56 indicate that the distance between the receiver and the signal source is decreasing, whereas a decrease in these rates indicates that the distance between the receiver and signal source is increasing.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the spirit and scope of the invention.

The invention is claimed as follows:

1. A radar detecting system comprising: antenna means for receiving radar signals; sweep generator means for producing a sweep signal comprising a cyclical frequency-swept signal over a predetermined range of frequencies and at a predetermined rate; mixer means coupled with said antenna means and said sweep generator means for mixing said sweep signal and said radar signals to form IF output signals; bandpass filter means coupled with said mixer means for passing ones of said IF output signals which have frequencies within a predetermined frequency band; detector means for detecting said IF output signals passed by said bandpass filter means during each cycle of said sweep signal and responsive thereto for producing corresponding output pulses; and control circuit means coupled with said detector means and responsive to a pair of said output pulses being produced for each of at least three successive cycles of said sweep signal and to both the first pulse and the second pulse of each of said pairs occurring at the same time intervals respectively relative to the corresponding cycle of said sweep signal for producing a warning signal.

2. A system according to claim 1 wherein said mixer means comprises a first mixer for mixing said sweep signal with said radar signal to produce a first IF signal, a second local oscillator for producing an oscillator signal at a predetermined frequency and a second mixer for mixing said oscillator signal with said first IF signal to produce a second IF signal comprising said IF output signal.

3. A system according to claim 1 wherein said detector means comprises an FM discriminator circuit.

4. A system according to claim 1 wherein said control circuit means further includes sweep control means coupled to said sweep generator means for producing sweep initiation pulse signals at predetermined intervals, said sweep pulse generator being responsive to each said sweep initiation pulse signal for initiating one cycle of said sweep signal.

5. A system according to claim 4 wherein said control circuit means comprises CPU means for measuring the time interval between each said sweep initiation pulse and each pulse of each of said pairs of pulses produced during the corresponding cycle of said sweep signal, for storing each said measurement and for comparing at least three successive ones of said measurements for each pulse to determine whether the measurements are the same.

6. A system according to claim 1 and further including alarm means responsive to said warning signal for producing an observable alarm.

7. A system according to claim 6 wherein said alarm means comprises signal strength detector means responsive to said radar signal for producing a DC signal having an amplitude which varies in a predetermined fashion in accordance with the level of said radar signal; and voltage-to-frequency converter means responsive to said DC signal for producing a first alarm signal alternating between a first level and a second level at a frequency which varies in a predetermined fashion in accordance with the amplitude of said DC signal.

8. A system according to claim 7 and further including observable indicator means responsive to said first alarm signal for alternating between first and second observable states at the rate of said frequency of said first alarm signal so as to be indicative of the strength of said radar signal.

9. A system according to claim 8 and further including gate means coupled intermediate said indicator means and said converter means and responsive to said warning signal for gating said first alarm signal to said indicator means and for blocking said first alarm signal in response to the absence of said warning signal.

10. A system according to claim 7 and further including controllably variable oscillator means for producing a second alarm signal at a frequency which varies in accordance with the level of a signal received thereby, said controllably variable oscillator means being coupled to receive said first alarm signal so as to vary between first and second frequencies corresponding to the first and second levels of said first alarm signal at the rate of the frequency of said first alarm signal.

11. A system according to claim 10 and further including second observable indicator means comprising audible indicator means for producing an audible alarm at a frequency which varies in a predetermined fashion in accordance with the frequency of a signal received thereby, said audible indicator means being coupled to receive said second alarm signal, whereby the frequency of said audible alarm varies between first and second frequencies at a rate indicative of the strength of the received signal.

12. A system according to claim 11 and further including gate means coupled intermediate said audible indicator means and said controllably variable oscillator means and responsive to said warning signal for gating said second alarm signal to said audible indicator means and for blocking the second alarm signal in response to the absence of said warning signal.

13. A system according to claim 8 wherein said first indicator means comprises visual indicator means.

14. A system according to claim 7 wherein said signal strength detector means produces said DC signal at an amplitude proportional to the level of the received signal and wherein said voltage-to-frequency converter alternates between the first and second levels at a frequency proportional to the amplitude of the DC signal from said signal strength detector means.

15. A system in accordance with claim 11 wherein said audible indicator means produces a tone at substantially the frequency of said second alarm signal.

* * * * *